Aug. 11, 1970     J. K. STEWART     3,523,372

METHOD FOR AVERAGING TRACK ERRORS

Filed Jan. 2, 1968

INVENTOR
JOHN K. STEWART

BY *Smart & Biggar*

ATTORNEYS.

United States Patent Office 3,523,372
Patented Aug. 11, 1970

3,523,372
METHOD FOR AVERAGING TRACK ERRORS
John Kenneth Stewart, Columbia, S.C., assignor to
Tamper Inc., Columbia, S.C.
Filed Jan. 2, 1968, Ser. No. 695,236
Int. Cl. E01b 29/04; G01c 5/00
U.S. Cl. 33—60                                                     1 Claim

ABSTRACT OF THE DISCLOSURE

A railroad track travelling system which has a main car and a satellite car connected to the main car by a spring tensioned cable. The satellite car being driven in a forwardly direction by an electrical traction motor and a control circuit for the traction motor which includes a microswitch operable by the spring tension cable when the spring is at maximum tension, i.e., when the satellite car has reached a predetermined maximum distance relative to the main car, to de-energize the forward traction motor and permit the satellite car to be returned to the main car under the action of the stored energy in the spring tension cable and a second switch in the control circuit operated in a suitable fashion, for example, by a time delay relay or by a movable stop associated with the satellite car driving mechanism, which stop is arranged to measure the extent of the reverse travel, to energize the forward traction motor and to again propel the satellite forwardly away from the main car. This system enables track discrepancies at the satellite car to be averaging and averaged according to the method of the invention.

BACKGROUND OF THE INVENTION

This invention relates to a method and means for averaging tension in a railroad track and to a device for controlling the position of a satellite car relative to a main car of a track travelling system.

It has been previously proposed in a track travelling system comprising a main tamping car and a selfpropelled leading satellite car to provide a light transmitter on the satellite car which projects a reference beam of radiation rearwardly towards the main tamping car, which tamping car carries photocell receivers which receive the transmitted radiation and a sensor element, which includes a shadow means, connected to the main tamping car between the transmitter and the receiver and arranged to run on the track and provide an indication of track condition by screening the transmitted radiation from the receiver or permitting the reciver to receive the transmitted radiation depending upon the existence or absence of low points in the track. In early proposals of this type of system, it was intended that the satellite car be fixed at a high point on the track and let the main tamping car approach the fixed satellite car. These proposals suffered from the disadvantage that the production rate of the main tamping car was seriously hampered by the necessity to relocate the satellite car at frequent intervals. This problem was solved by moving the satellite car along with the main car. However, since the satellite car was now no longer positioned at a pre-selected high point, it was possible that the satellite car would be in an extremely low joint or deformed part of the rail at the time the track condition sensing operation and that consequently, an error would creep into the system.

SUMMARY OF THE INVENTION

The present invention seeks to reduce the possibility of errors arising from misplacement of such a satellite car by providing a method of integrating or averaging out discrepancies in the track contour at the satellite car by means of a controller which causes the satellite car to move away from and towards the main tamping car in repetitive cyclic fashion during sensing operations.

Accordingly the present invention provides in a method of surveying a railway track which comprises projecting a reference beam towards a receiver, and sensing the track condition with a sensor element which carries beam interference means, the improvement which comprises averaging track descrepancies at the projector by moving the projector towards and away from the sensor element by a predetermined distance during track condition sensing operations.

In one of its aspects the invention provides that the sensor element senses track surface condition, whilst in another of its aspects the sensor element senses track horizontal alignment condition.

Also, according to the present invention, a railroad track travelling systems including a main track travelling car and a track travelling satellite car movable along the track relative thereto is provided with a first drive means for propelling the satellite car away from the main car; second drive means for propelling the satellite car towards the vehicle; first control means actuable when the satellite car has reached a predetermined maximum distance from the main car to terminate the action of said first drive means and to premit the satellite car to be returned towards the main car under the action of the second drive means; and control means actuable when the satellite car has reached a predetermined minimum distance from the main car to reverse the satellite car and reactivate the first drive means to propel the satellite car away from the main car thereby completing a cycle of movement of the satellite relative to the main car.

BRIEF DESCRIPTION OF THE DRAWINGS

The following is a description by way of example of certain embodiments of the present invention reference being had to the accompanying drawings in which.

DESCRIPTION OF THE PREFERRED EMBODIMENTS

Figure 1:
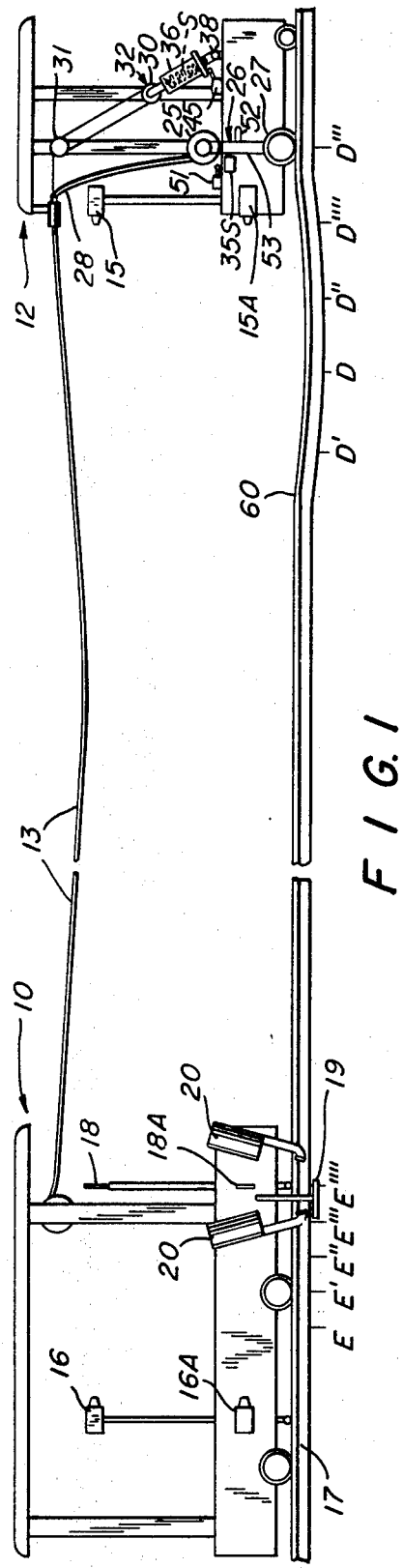
FIG. 1 is a diagrammatic representation of a tamping and satellite car on a railroad track.

A main jacking and tamping car 10 is connected to a self propelled satellite car 12 through a cable 13. The satellite car carries an infrared beam transmitter means 15 which projects a reference beam of infrared light towards a receiver means 16 referenced to the track 17 and carried by the main tamping car 10. A sensor element, including a shadow element 18, also referenced to the track 17, is interposed between the transmitter and the receiver and acts as a sensor of track condition in well-known manner. Although the sensor shadow board, the transmitter and the receiver means have been shown arranged to survey surface condition, it is to be understood that the invention is equally applicable to horizontal alignment surveying where a transmitter means 15A, receiver means 16A and sensor element and shadow board 18A are located to survey the horizontal alignment condition. The jacks 19 and tamping heads 20 are carried on the machine 10 for jacking and tamping the track to the reference beam as is well known. (Again, as is well known, jacks could be arranged horizontally to throw the track laterally in the case of horizontal alignment.) The satellite car 12 is driven by an electric traction motor 25 through a chain drive 26 to a wheel 27 of the satellite car. Power for the traction motor and for the transmitter 15 is transmitted from the generator on the main car 10 by means of electrical cable 28 carried by the cable 13.

The cable 13 at the satellite car is entrained over the sheaves 31 of a pulley system 32 and anchored to itself adjacent the top sheave 31. The lower sheave 30 is connected by means of a clevis to a spring cover 36 positioned in the fashion of a sleeve over a spring S which is connected at its upper end internally to the spring cover 36 and at its lower end to the flow of the satellite car 12 through an anchor 38.

The motor 25 is a 3-phase AC motor electrically connected to a generator on the main car by three wires, 40, 41 and 42 in the cable 28. A switch 45 on the satellite car 12 is biased into contact with the spring cover 36 when the cover is at its lower limit, that is, under conditions other than the condition of maximum tension in the spring, so that the contact 45A is normally closed.

Figure 2:
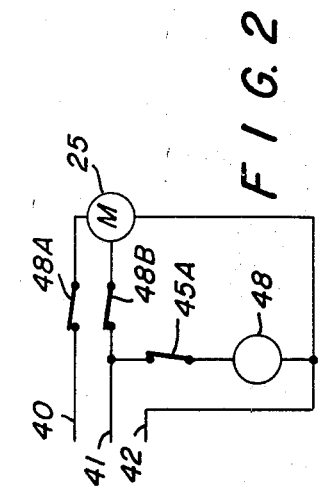
FIG. 2 is a digram of one suitable circuit for carrying out the present invention.

FIG. 2 shows one form of control circuit. In series in the lines 40 and 41 are normally closed contacts 48A and 48B of the time delay 48 which is parallel across the lines 42, 41 and in series with the contact 45A of the switch 45.

In operation, the traction motor 25 is started and the satellite car 12 moves away from the main tamping car 10 until, at the limit of its outward travel, the cable 13 becomes taut, the spring 36 is extended in tension and the cover moves upwardly with the spring and breaks contact with the micro switch 45. This causes the micro switch 45 to actuate to open contact 45A and disconnect the motor 25. The satellite car 12 is now returned towards the main car 10 under the action of the spring 36 and weight of the extended cable 13. The opening of contact 45A causes the timer 48 to start and to open contacts 48A and 48B to two of the phases of the motor 25. As soon as the satellite car 12 commences its return journey towards the main car 10, the spring contracts and the spring cover re-engages the switch 45 and closes its contacts 45A. However, the motor 25 cannot restart since the contacts 48A and 48B of the timer 48 are still open. After the necessary length of time has elapsed, say between 4 and 5 seconds, the timer 48 recloses the contacts 48A and 48B and re-energizes the motor 25 in all of its three phases. This then terminates the return travel of the satellite car 12 which now is driven, once again, away from the main car 10 by motor 25. When the outer limit of travel has been reached and the cable 13 becomes taut and stretches the spring 36, the switch 45 actuates and the cycle is repeated.

Obviously, a jacking and tamping operation will have been completed during the travel of the satellite car 12 and the main car 10 will have started to move forward with the consequent slackening of the cable 13. Thus, the satellite car will have to move to a point farther down the track in order to actuate the switch 45 than the point at which the switch 45 was actuated at the immediately preceding cycle.

Consider the invention as it is applicable to vertical curves, 60 denotes a part of a vertical snag in a track at an exaggerated scale. Let E be the point at where the shadow board on the main car 10 is when the first sighting operation is made and let D be the point at which the satellite car happens to be on the curve 60 at that instant. The time to complete one cycle of travel backwards and forwards by the satellite car is, say, 12 seconds, whereas the time between surveying, and incidentally, jacking and tamping operations at the main car is, say, five seconds. Thus when the main car has moved from E to E' and five seconds have elapsed the satellite car has reversed towards the main car during that five seconds and has reached the position D'. Now a second surveying operation occurs. The main car now moves forward to E" during the next five seconds and in the meantime, the satellite car continues to move backwards for one more second and now forward for four seconds so that when the third surveying operation is made, the main car is at the point E" and the satellite car is at point D". It will be observed, however, that since the main car has moved forward during the last 10 seconds from point E to point E", the forward motion of the satellite car now has to be greater and will exceed the original point D since the outer maximum distance governed by the cable 13 is a relative one between the main car and the satellite car. When the main car has reached point E''', the satellite car will have moved from D" to the maximum extent of the cable 13 and will now be returning once more towards the main car so that the fourth surveying operation will occur with the satellite car at point D'''. Again, after a further five seconds elapse, the main car has moved forward to point E'''' and the satellite car has continued its return journey to point D'''', and so on.

It will be obvious that this random sampling of positioning of the satellite car throughout the part of the sag 60 will reduce the possibility of reproducing the sag 60, or for that matter a high point, proportionately at the shadow board.

Figure 3:
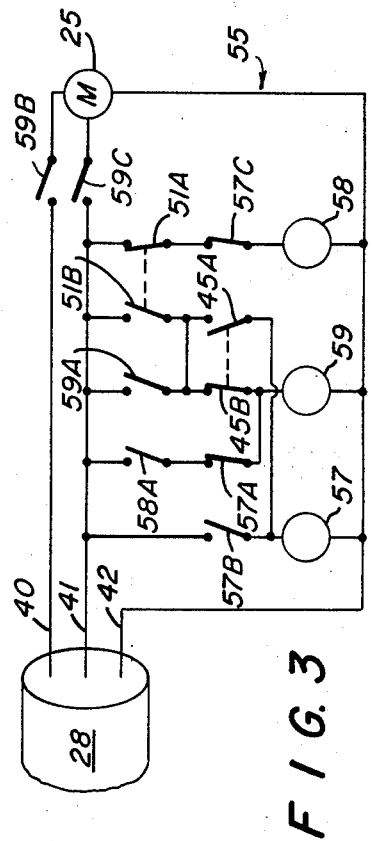
FIG. 3 is a diagram of an alternative circuit.

In FIG. 3 an alternative arrangement is illustrated where the timing device 48 is replaced by a limit switch 51 operated by a cam 52 provided for this purpose magnetically attached to the chain 53 of chain drive 26 of the drive between the motor 25 and the wheel 27. The network 55 also includes relays which are operable to permit the satellite car 12 to run out from the main tamping car 10 to the limit of the extension of the cable 13. As before current is supplied from the generator on the car 10 through the cable 28. Current from wire 41 passes through contact 51A of switch 51, through the normally closed contact 57C of relay 57 to energize relay 58. This closes contact 58A allowing current to flow therethrough to energize relay 59. Contact 59A will close forming a hold circuit on relay 59. Contacts 59B and 59C close, supplying current through a torque motor 25 causing the satellite car 12 to move forward away from the main tamping car 10. When the satellite car 12 reaches the end of the cable 13 the spring limit switch 45, which in this embodiment is 2 contacts 45A and 45B, operates opening contact 45B and closing contact 45A.

Current now flows from wire 41 through contact 59A, through 45A to energize relay 57. Contact 57B of relay 57 now forms a hold circuit, keeping relay 57 energized as long as power is supplied to the satellite car 12. Contact 57C opens preventing relay 58 from becoming energized as long as power is supplied to the satellite car 12.

Now with the satellite car 12 in operating position contact 57A opens and this part of the circuit is rendered inoperable.

When switch 45 is operated and the relay 57 has been pulled in, current will cease to flow to relay 59 causing the relay to drop out. The contacts 59B and 59C open de-energizing the torque motor and the satellite car 12 is, as before, returned towards the main car under the action of the stored spring energy and the weight of the cable 13. After the satellite car 12 has returned a predetermined distance, governed by the length of the chain 53, the cam 52 on the chain 53 operates the limit switch 51 to close contact 51B and open contact 51A. Again as before, as the satellite car 12 approaches the main tamping car 10 the switch 45 returns to its original position and thus the contact 45B has been closed. Also when the cam 52 passes the limit switch 51 this switch will be operated and its contact 51B will close. Thus, with the contact 51B closed the current flows therethrough and through contact 45B to energize relay 59. Contact 59A forms a hold circuit and contacts 59B and 59C close so that the torque motor may be energized and the satellite car 12 again runs to the end of the cable 13. At the end of the cable, the limit switch 45 operates to open its contact B, de-energizing relay 59 and opening the contacts 59B and 59C, the satellite car 12 is then returned by the spring towards the machine. Again when the satellite car has travelled the appropriate distance towards the main tamping car, the cam 52 operates the switch 51 closing the contacts 51B and re-energizing relay 59 to establish the hold circuit, and so the cycle is repeated.

Stop 35S is provided to prevent cam 52 from over-travelling the switch 51 both in the forward and reverse travel of the satellite car. The cam 52 being magnetically held in the chain 53, when the cam 52 contacts the stop 35S it is arrested and the chain continues its travel slipping relative to the cam 52.

Although only two embodiments of apparatus according to the invention have been described, it will be clear to those skilled in the art that other modes of operation are possible without departing from the spirit of the invention. For example the motor 25 could be replaced by a reversible motor and switching could be provided to operate through, say, time delay circuits, to cause the appropriate to and fro motion of the satellite car 12 relative to the main car 10.

What I claim as my invention is:
1. In a method of surveying a railway track by projecting a reference beam from a movable satellite car towards a receiver operatively connected to a movable main car, and sensing the track condition with a sensor element which carries beam interference means and which is operatively connected to the main car, the improvement which comprises driving the satellite car towards and away from the main car to hunt about a series of stations progressively moving along the track during track condition sensing operations whereby to average track discrepancies at the satellite car.

References Cited
UNITED STATES PATENTS

| | | | |
|---|---|---|---|
| 3,192,870 | 7/1965 | Plasser et al. | 104—7 |
| 3,381,626 | 5/1968 | Fagan et al. | 104—7 |

ARTHUR L. LA POINT, Primary Examiner

R. A. BERTSCH, Assistant Examiner

U.S. Cl. X.R.

104—7